United States Patent [19]

Brochu et al.

[11] Patent Number: 5,521,026
[45] Date of Patent: May 28, 1996

[54] PROCESS FOR PREPARING SOLUTIONS OF A POSITIVE ELECTRODE FOR POLYMER ELECTROLYTE BATTERY BY PRE-DISPERSION OF SOLID POWDERS

[75] Inventors: Fernand Brochu, Longueuil; Michel Duval, Montreal, both of Canada

[73] Assignee: Hydro-Quebec, Montreal, Canada

[21] Appl. No.: 203,317

[22] Filed: Mar. 1, 1994

[51] Int. Cl.$^6$ .................................................. H01M 4/62
[52] U.S. Cl. ........................ 429/192; 429/212; 252/510
[58] Field of Search ................................. 429/192, 212; 252/506, 507, 510

[56] References Cited

U.S. PATENT DOCUMENTS

| | | | |
|---|---|---|---|
| 4,589,197 | 5/1986 | North | 429/192 X |
| 4,720,910 | 1/1988 | Rourke et al. | 429/192 X |
| 4,976,890 | 12/1990 | Felter et al. | 252/507 X |
| 4,990,413 | 2/1991 | Lee et al. | 429/192 |
| 5,066,422 | 11/1991 | Felter et al. | 252/507 X |
| 5,330,856 | 7/1994 | Gonzales | 429/212 |

*Primary Examiner*—Stephen Kalafut
*Attorney, Agent, or Firm*—Oblon, Spivak, McClelland, Maier & Neustadt

[57] ABSTRACT

To prepare polymer dispersions containing large quantities of solid particles, with at least some of these consisting of materials with a high specific area (>50 m$^2$/g) or oil absorption capacity, the mixture of particles is first co-ground in a non polar solvent. The co-ground mixture is dried until obtaining a dry powder of reagglomerated particles, which is dispersed in a solution containing a polymer and possibly a salt. Large quantities of solid particles can thus be dispersed while maintaining adequate rheological properties for the dispersion, and low porosities and few surface defects in the films obtained by coating the dispersion. This process can be used to prepare thin films of positive electrode for lithium polymer batteries, as well as in the paint, coatings and magnetic tape industry.

16 Claims, No Drawings

PROCESS FOR PREPARING SOLUTIONS OF A POSITIVE ELECTRODE FOR POLYMER ELECTROLYTE BATTERY BY PRE-DISPERSION OF SOLID POWDERS

BACKGROUND OF THE INVENTION a) Field of the Invention

The present invention concerns the preparation of dispersions to produce films of positive electrodes for use in polymer electrolyte batteries of the lithium polymer type (LPB), by pre-dispersion or co-grinding of the solid powders. More particularly, the present invention concerns a process for the preparation of polymer dispersions with a high content of solid particles and with at least one of the types of particles consisting of materials with a high specific surface (>50 m$^2$/g) or oil absorption capacity, which dispersions still maintain rheological properties adequate for films with relatively low porosities and a few defects.

b) Description of Prior Art

Lithium/polymer electrolyte batteries of the LPB type are manufactured by superposing three main types of films: a film of lithium, a film of an electrolyte comprising a polymer and a salt of lithium, and a film of a positive electrode. Each of these films has a thickness between 5 and 50 μm, for a total thickness of 100 to 150 μm for the elementary film of battery. About thirty meters of elementary film, 15 cm wide, are typically required to give a battery of 100 Wh.

The films of positive electrode are prepared by coating, on an aluminum foil or metallized plastic film, used as an electrical collector, a dispersion containing an electrochemically active material such as vanadium oxide, some carbon black to ensure electronic conduction, a polymer-salt electrolyte to ensure ionic conduction and the mechanical bond between the solid particles mentioned above, and appropriate solvent mixtures, based for example on acetonitrile.

The amounts of active material and carbon black should be high, so as to ensure a good contact between the particles in the dried films of positive electrode, a good electrochemical performance during the cycles of charge and discharge of the battery, and the highest energy content possible, in terms of volume as well as of mass. In practice, however, there are limits to the quantities which may be incorporated, over which either the dispersion are too viscous to be coated in the form of thin films, or the films have lost all their mechanical cohesion, or still the gains in volume are more than offset by the losses resulting from the increasing porosity which appears in the films.

This is particularly true in the presence of materials with very high specific surfaces (>50 m$^2$/g) such as carbon black, which requires more liquid and binding agent to be suitably wetted. Thus, the porosity of films containing volume percentages in active material/carbon black/electrolyte higher than 25/6/69 in the dried films, already start increasing rapidly, while the desirable volume percentages for good electrochemical performances should rather stand from 30/8/62 to 40/10/50.

SUMMARY OF INVENTION

It is an object of the invention to provide a process for the preparation of polymer dispersions containing high quantities of mixtures of solid particles, with at least one of the types of particles consisting of materials with a high surface area (>50 m$^2$/g), such as carbon black.

Another object of the invention consists in the preliminary co-grinding of the particles in a solvent of the heptane type, evaporating the latter, drying the mixture of powders so as to reagglomerate the carbon black particles on the other particles, and adding the solution of polymer, preferably in diluted form first, then concentrated.

Another object of the invention is to enable the incorporation of a much higher quantity of these particles without increasing the viscosity of the dispersion and the porosity of the films.

Another object of the invention relates to the preparation of films of positive electrodes for LPB batteries, and also in the preparation of paints, coatings and magnetic tapes.

In order to overcome the disadvantages mentioned above, we have provided a process for the preparation of a dispersion containing a high percentage of particles while ensuring that its rheological properties remain adequate for coating thin films of good quality and relatively low porosities. This process is characterized by carrying out in a solvent a preliminary co-grinding of the solid particles with size between about 5 and 10 μm, and of those consisting of materials of high specific area (>50 m$^2$/g) or oil absorption capacity with sizes lower than about 2 μm, thereby obtaining a co-ground mixture in the solvent, evaporating and drying the co-ground mixture until obtaining a dry powder of reagglomerated particles, then dispersing the dried co-ground mixture in a solution containing a polymer.

The process described in the present application enables to reach desirable volume and mass percentages while maintaining the viscosity of the solutions and the porosity of the dried films at acceptable levels. It consists in a preliminary co-grinding of the two types of particles in a solvent preferably non-polar such as heptane, drying the co-ground mixture and dispersing the same for example with a solution of polymer-salt electrolyte.

The efficiency of the process may be related to the fact that it allows the coating of the very small carbon black particles onto the surface of the larger particles, thereby facilitating the wetting of the co-ground mixture by the electrolyte solution.

This process, which was mainly designed for preparing films of positive electrodes for lithium/polymer electrolyte batteries of the ACEP type, may be used more generally to prepare films of polymers and coatings containing large quantities of mixtures of solid particles, with at least one of the types of particles consisting of materials with high specific surfaces (>50 m$^2$/g), in the paints, coatings or magnetic tapes industry, as this will be obvious to one skilled in the art.

DESCRIPTION OF PREFERRED EMBODIMENTS

The process according to the present invention is particularly suitable for use with the following materials and concentrations, without restrictions thereto:

Mixtures of solid powders containing:

1) particles with sizes between 5 and 100 μm, for example based on inorganic compounds such as vanadium, titanium, iron, chromium or copper oxides or sulfides, etc.

2) particles with high specific surface (>50 cm$^2$/g) or oil absorption capacity and of very small sizes, for example 2 μm, such as carbon black (Shawinigan black, Kelyen black) or ultrafine silica powders (AEROSIL™, CARBOSIL™);

Co-grinding solvents of the aliphatic or cycloaliphatic type such as heptane or cyclohexane, which enable a good re-agglomeration of the mixtures of particles. Polar solvents such as acetonitrile or mixtures of acetonitrile and toluene are less suitable.

Volume percentages of solid particles in the dried films higher than 25% for total particles of the first type and 6% for particles of the second type with a high surface area (>50 cm$^2$/g). Above these values porosity starts to appear in the dried films and the co-grinding process becomes interesting to use. Using the co-grinding process, it is thus possible to obtain films of still acceptable porosity with the volume percentages of 40% and 10% necessary for electrochemical applications in LPB batteries, and up to 70% and 15% for application in the paints, coatings and magnetic tapes industry.

Preferably, according to the invention, material with a high specific surface (>50 cm$^2$/g) and very small particle size, for example carbon black, and a solvent, for example heptane, are introduced in a ball mill, and are milled for about 30 minutes. The material with higher particle sizes, for example vanadium oxide, is added to the mixture and milled again for about 30 minutes. Heptane is evaporated and the mixture of powders is dried under a vacuum at 85° C. for 48 hours. A solution of polymer-salt electrolyte is then added to this mixture of co-grounded re-agglomerated powders and is milled to prepare a solution of positive LPB electrode, and a film of positive electrode obtained by coating.

As will be observed in the examples which follow, the main factor responsible for the success of the process is the drying of the co-ground powders, which enables a re-agglomeration of the particles and a better wetting of the particles by the electrolyte solution, particularly when using dilute dispersions first.

The invention is illustrated by the examples which follow, given without restriction.

EXAMPLE 1

A solution of a polymer-salt electrolyte is prepared by dissolving 10 g of amorphous copolymer (normally used in lithium polymer-LPB batteries) and 2 g of lithium salt TFSI (lithium trifluorosulfonimide) in 70 ml of acetonitrile and 18 ml of toluene at a concentration of 0.12 g of polymer-salt complex per ml of solution. About 100 ml of this solution and 4 g of Shawinigan black are introduced in a ball mill of the "Red Devil"™ type, containing three steel balls of 16 mm OD. The mixture is placed in a paint mixer and milled for 30 minutes. 25 g of vanadium oxide are then added and milled for 30 minutes. This mixture corresponds to a vanadium oxide/carbon black/polymer-salt volume percentage of 40/10/50 in the dried film. Its viscosity is high (>100,000 cps) and it is difficult to coat. The film of positive electrode obtained by coating the mixture on a thin film of aluminum foil substrate is texturized, barely uniform and very rough by Dektak analysis . Its thickness, once dried, is 75 μm and its porosity is evaluated at 100% by measuring the weight of film per surface unit. Mounted as an LPB battery with a film of thin electrolyte and a film of lithium, this film has a percentage of utilization of the positive electrode material which is acceptable, but has a tendency to produce dendrites.

EXAMPLE 2

Example 1 is repeated except that vanadium oxide and Shawinigan black are added together. The solution obtained is still more viscous and it contains lumps. The film of positive electrode is even less uniform.

EXAMPLE 3

Example 1 is repeated except that 80 ml of a more diluted solution of an electrolyte, at a concentration of 0.08 g/ml, is used. After milling with carbon black and vanadium oxide, 20 ml of a more concentrated solution of electrolyte (0.28 g/ml) are added to give the same final concentration (0.12 g/ml). The results are not better than in example 1.

EXAMPLE 4

4 g of carbon black and 100 l of heptane are milled for 30 minutes, then 25 g of vanadium oxide are added and milled for 30 minutes as in example 1. Heptane is evaporated, and the mixture of powders is dried under a vacuum at 85° C. during 48 hours. 100 ml of the solution of electrolyte of example 1 are added and milled for 40 minutes. The viscosity of the dispersion obtained is about 500 cps. Films of positive electrode prepared with this dispersion are smooth, uniform, have a thickness of 48 μm and a porosity of about 30%. The electrochemical behavior is excellent, without dendrites.

EXAMPLE 5

Example 4 is repeated, except that acetonitrile is used. The final dispersion is slightly more viscous (600 cps) and the electrochemical behavior (% of utilization) is not as good.

EXAMPLE 6

Example 4 is repeated except that, 80 ml of a diluted electrolyte solution (at 0.08 g/ml) are added to the mixture of dried co-ground powders, the mixture is milled for 30 minutes, and 20 ml of a more concentrated solution (0.28 g/ml) are added. Films of positive electrode obtained in this manner are smooth, uniform, have a thickness of 44 μm and a porosity of 20%, with an excellent electrochemical behavior.

EXAMPLE 7

Example 6 is repeated except that a Premier Mill™ micro-mill with a horizontal axis and a 36 liter capacity is used with a proportionately higher quantity of all the materials. The results obtained are identical.

We claim:

1. Process for preparing a dispersion containing at least about 20 weight percent of a mixture of solid particles, with at least one of the types of particles consisting of materials with a specific surface higher than 50 m$^2$/g while maintaining the rheological properties of said dispersion adequate for coating thin films with relatively low porosities and few surface defects which comprises:

co-grinding a mixture of solid particles of a first and a second type in a non-polar solvent, said particles of the first type having a size between about 5 and 100 μm, and said particles of the second type, with a surface area higher than 50 m$^2$/g, having a size lower than 2 μm, and obtaining a co-ground mixture, drying the co-ground mixture until obtaining a dry powder of encapsulated and reagglomerated particles, and dispersing the powder in a polar solvent or in a dilute solution of polymer in said polar solvent, and adding a concentrated polymer/salt solution to obtain a final dispersion.

2. Process according to claim 1, wherein the solid particles of the first type comprise inorganic compounds.

3. Process according to claim 2, wherein the inorganic compounds are selected from oxides and sulfides.

4. Process according to claim 3, wherein the inorganic compounds are selected from oxides and sulfides of vanadium, titanium, iron, chromium and copper.

5. Process according to claim 1, wherein the particles of the second type with a surface area higher than 50 $m^2/g$ are selected from a carbon black and silica powders, said silica powder-having a size lower than 2 μm.

6. Process according to claim 5, wherein said particles are carbon blacks selected from Shawinigan blacks and Kehjen blacks.

7. Process according to claim 1, wherein the final dispersion containing the polymer and the co-ground mixture is coated and a dried film is obtained by drying.

8. Process according to claim 7, wherein the co-ground mixture contains carbon black and said solid particles of the first type, said dispersion contains a polymer-salt electrolyte, and the volume percentage of solid particles/carbon black/electrolyte is between 30/8/62 and 40/10/50 in the dried film.

9. Process according to claim 1, wherein said co-grinding is carried out in a non-polar solvent.

10. Process according to claim 9, wherein the non-polar solvent is selected from the group consisting of an aliphatic and a cycloaliphatic hydrocarbon.

11. Process according to claim 1, wherein the particles with a specific surface higher than 50 $m^2/g$ are first milled for about 30 minutes, after which the solid particles of the first type are added to the mixture which is milled again for about 30 minutes, said solvent is evaporated and the mixture of powders is dried under a vacuum at about 85° C. for about 48 hours.

12. Process according to claim 10, wherein the solvent comprises heptane or cyclohexane.

13. Process according to claim 1, wherein the volume percentages, in a dried film, of the solid particles of the first type and of the particles of the second type material with a specific area higher than 50 $m^2/g$ are higher than about 25% and 6% respectively.

14. Process according to claim 13, wherein said percentages in the dried films are about 40% and 10% respectively, for electrochemical applications in lithium polymer batteries (LPB) where low porosities are required.

15. Process according to claim 13, wherein said percentages are about 70% and 15% respectively for applications in the paints, coatings and magnetic tapes industry where very high solid contents are desired and some porosity of the dried films is acceptable.

16. Process according to claim 11, further comprising:

milling carbon black first in heptane, then adding vanadium oxide to form a mixture of powders, drying and dispersing said mixture of powders in a mixture of acetonitrile and toluene to form a dispersion, adding said dispersion to a concentrated solution of an amorphous copolymer electrolyte and a salt of lithium consisting of lithium trifluorosulfonimide in acetonitrile and toluene to form a final dispersion, and coating a film of LPB positive electrode from the final dispersion.

* * * * *